March 28, 1961 L. G. EHMANN Re. 24,958

LIFT TRUCK WITH SINGLE TELESCOPIC MAST

Original Filed Sept. 30, 1954 5 Sheets-Sheet 1

INVENTOR.
LESLIE G. EHMANN
BY
Buckhorn and Cheatham
ATTORNEYS

March 28, 1961 L. G. EHMANN Re. 24,958

LIFT TRUCK WITH SINGLE TELESCOPIC MAST

Original Filed Sept. 30, 1954 5 Sheets-Sheet 2

INVENTOR.
LESLIE G. EHMANN
BY
Buckhorn and Cheatham
ATTORNEYS

LIFT TRUCK WITH SINGLE TELESCOPIC MAST

Original Filed Sept. 30, 1954 5 Sheets-Sheet 3

INVENTOR.
LESLIE G. EHMANN
BY
Buckhorn and Cheatham
ATTORNEYS

March 28, 1961 L. G. EHMANN Re. 24,958

LIFT TRUCK WITH SINGLE TELESCOPIC MAST

Original Filed Sept. 30, 1954

5 Sheets-Sheet 4

INVENTOR.
LESLIE G. EHMANN
BY
Buckhorn and Cheatham
ATTORNEYS

March 28, 1961 L. G. EHMANN Re. 24,958

LIFT TRUCK WITH SINGLE TELESCOPIC MAST

Original Filed Sept. 30, 1954 5 Sheets-Sheet 5

INVENTOR.
LESLIE G. EHMANN
BY
Buckhorn and Cheatham
ATTORNEYS

United States Patent Office

Re. 24,958

Reissued Mar. 28, 1961

24,958

LIFT TRUCK WITH SINGLE TELESCOPIC MAST

Leslie G. Ehmann, Portland, Oreg., assignor, by mesne assignments, to Hyster Company, a corporation of Nevada Original No. 2,915,210, dated Dec. 1, 1959, Ser. No. 459,492, Sept. 30, 1954. Application for reissue Sept. 30, 1960, Ser. No. 60,282

10 Claims. (Cl. 214—674)

Matter enclosed in heavy brackets [ ] appears in the original patent but forms no part of this reissue specification; matter printed in italics indicates the additions made by reissue.

This invention relates to industrial lift trucks, and particularly to improvements in the load elevating mechanism of such a truck.

The visibility of the driver of the conventional lift truck is considerably impaired by the load elevating mechanism thereof, which is mounted at the forward end of the truck. This load elevating mechanism projects upwardly to a level usually above that of the eye level of the operator and extends across the front of the truck a distance equal to substantially that between the front wheels of the truck. Such a load elevating mechanism conventionally includes an outer upright mounted on the truck frame and a telescopically related, elevatable inner upright. The outer upright usually comprises a pair of inwardly facing, spaced-apart channels slidably receiving the inner upright, which also comprises a pair of spaced-apart, inwardly facing channels. Between the channels of the inner upright is disposed a hydraulic elevating ram, which is operatively connected to the inner upright, and operatively connected by means of a chain and sheave arrangement to a load carriage, the latter usually having rollers having a rolling, guided fit with the channels of the inner upright.

When maneuvering the conventional lift truck into a position to bring the lift forks or other load engaging mechanism into register with a load in the process of picking it up, or into register with a deposit station or location when depositing a load, the driver has to peer around the upright channels, or through the openings between the ram and the elevating chain or chains, or through the openings between the chains and the upright channels, in order to bring the truck or the tips of the lift forks to the desired position. Also, the driver has similar difficulty when operating the truck in confined quarters or along narrow aisles. Such poor visibility causes slow truck operation, damage to goods or articles being handled because of their being bumped against objects along the path of travel of the truck, and also causes damage to objects along the path which are bumped during operation of the truck.

Although many attempts have been made to improve the visibility of the driver of the conventional lift truck, the above-described load elevating mechanism has not, up to the present time, been substantially altered.

It is a main object of the present invention to provide a lift truck in which the upright structure is so constructed that the visibility of the operator or driver of the truck is increased to a remarkable extent to thus enable faster handling of goods and provide increased safety of operation.

A more particular object of the present invention is to provide a lift truck having an upright or mast structure and an elevating ram arranged in an extremely compact unit at the forward end of the truck, to afford greatly increased visibility for the driver of the truck over that afforded by previous trucks.

Another object of the present invention is to provide a lift truck having the load carriage mounted on and movable along the outer upright, instead of the inner upright, to permit the uprights to be formed in a more compact unit than previously has been possible.

Another object of the present invention is to provide a lift truck wherein the inner and outer uprights comprise single, telescopically related members of tubular form having small diameters as compared to the lateral dimensions of the conventional channel uprights.

Another object of the present invention is to provide an upright unit constructed to have substantially greater resistance to side loading stresses than conventional units, to enable it to operate successfully in side loading operations.

A further object of the present invention is to provide a truck of the character above described wherein the load carriage may be elevated without extension of the mast or upright structure.

A still further object of the present invention is to provide an improved load elevating mechanism attachment for a lift truck.

Another object of the present invention is to provide a lift truck having a simple and inexpensive load elevating mechanism and, in particular, one wherein the load carriage is formed to permit a load to be supported at a place close to the front axle of the truck despite a considerable forward disposition of the upright structure.

Various other objects of the present invention will be apparent from the following description taken in connection with the accompanying drawings, wherein.

Figure 1:
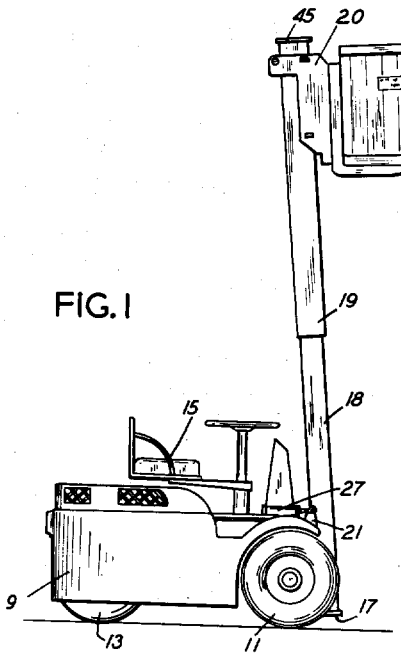
Fig. 1 is a somewhat schematic, right-hand, side elevational view of a lift truck incorporating the concepts of the present invention, showing the load elevating mechanism in its extended position.

Referring to the accompanying drawings wherein similar reference characters designate similar parts throughout, a lift truck incorporating the concepts of the present invention is disclosed. It is pointed out that the present invention is concerned with the load elevating mechanism of the truck, and thus the particular truck shown, apart from the elevating mechanism, is merely illustrative of the type of truck on which the elevating mechanism may be mounted.

In Fig. 1, the lift truck is shown as including a body 9 supported by a pair of front wheels 11 and a single dirigible rear wheel 13. A driver's seat 15 is mounted on the body and faces forwardly. Mounted on the front of the truck is a load elevating mechanism including a mast or upright support or base 17 on which is mounted an upright or mast structure. This upright or mast structure includes an inner tubular or hollow columnar upright or mast 18 and a telescopically related, outer tubular or hollow columnar upright or mast 19 which fits over the inner upright. Mounted for movement along the outer upright 19 is a load carriage 20.

Figure 3:
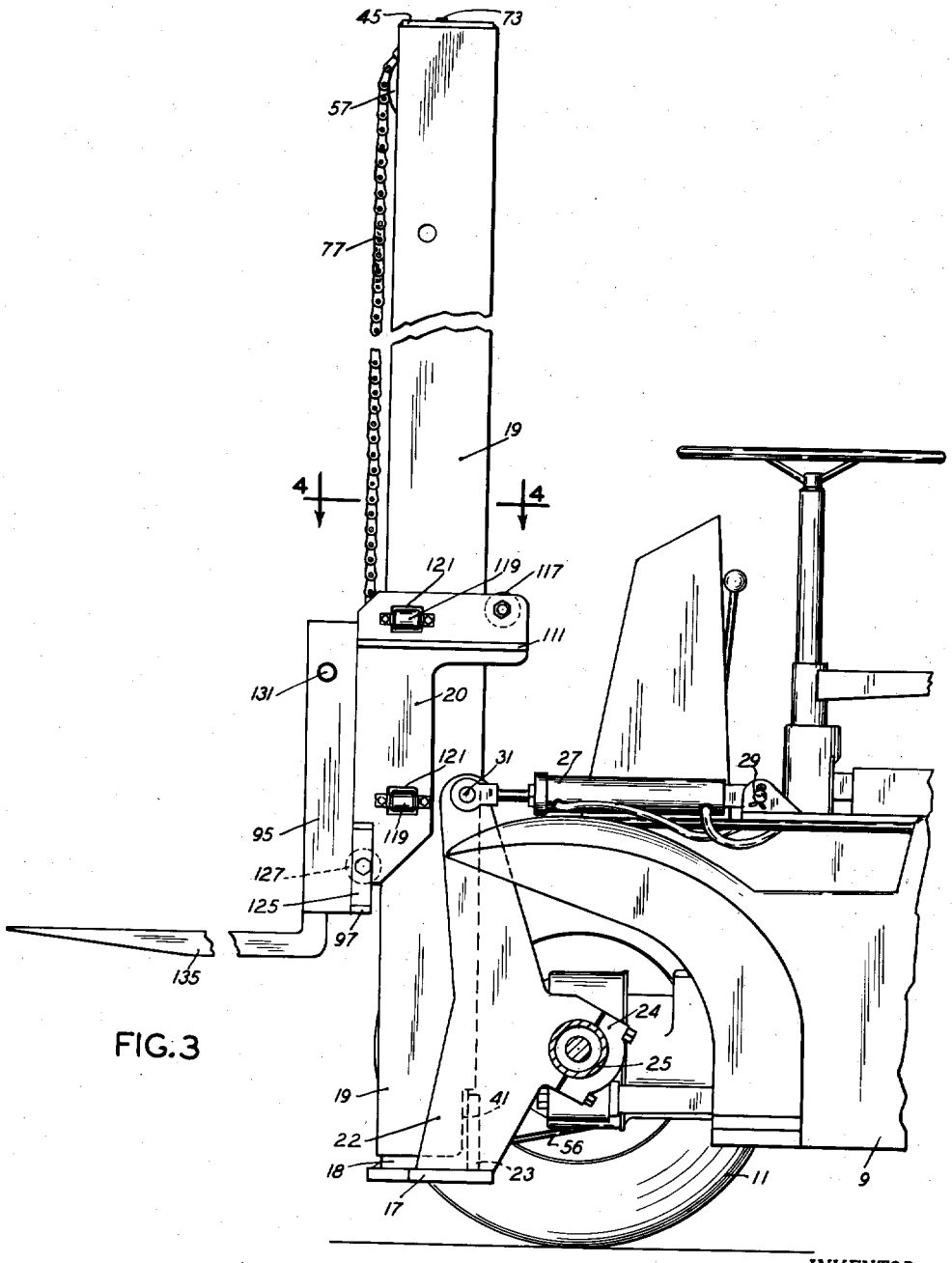
Fig. 3 is an enlarged, fragmentary side view in elevation taken from the left-hand side of the truck, the load carriage being shown in a partially elevated condition, the left front wheel being shown removed and the axle assembly being shown in section.
Figure 4:
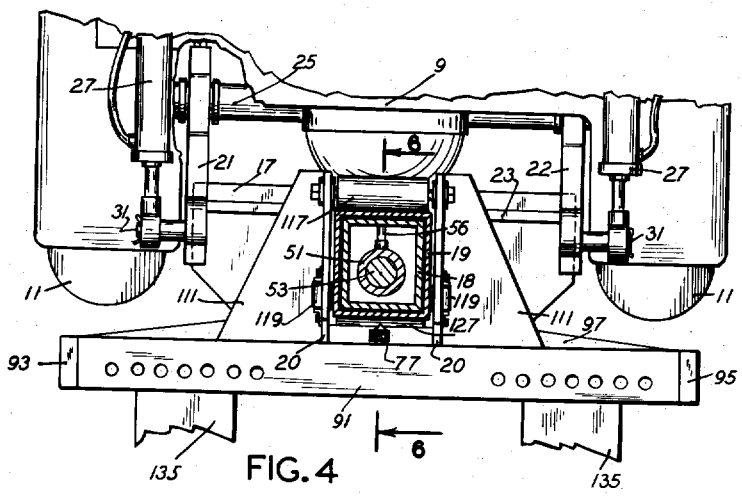
Fig. 4 is a fragmentary view in horizontal section taken along line 4—4 of Fig. 3.
Figure 5:
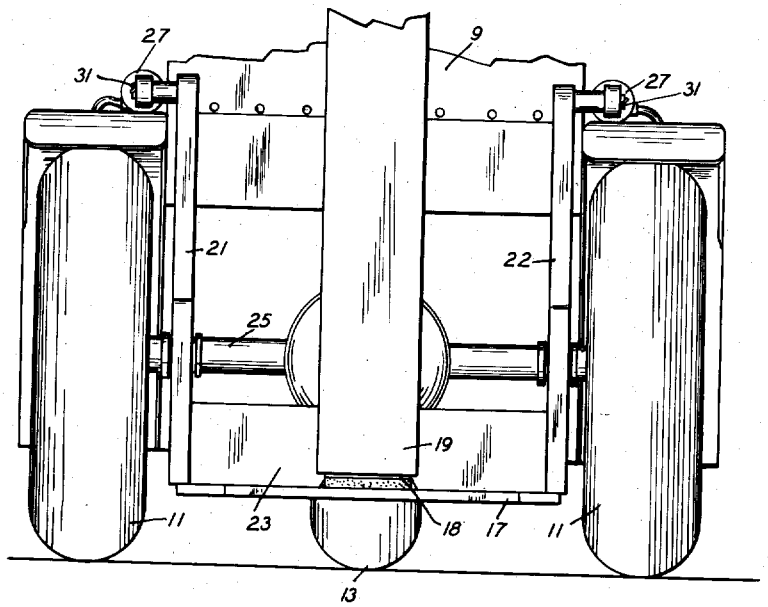
Fig. 5 is a fragmentary, front elevational view of the lift truck, the load carriage being removed for convenience in illustration.

Referring particularly to Figs. 3, 4 and 5, the mast or upright support 17 is shown as assuming the form of a flat, heavy plate arranged between the front wheels 11 and on which the inner upright 18 is welded or otherwise fixedly secured. Fixed to support 17 in spaced-apart, parallel relation is a pair of upstanding bracket arms 21 and 22, which are journaled, such as by split bearings 24, on the front axle 25 of the truck (see Fig. 3). It will be obvious to those skilled in the art that arms 21 and 22 could be journaled on the truck in other ways than the particular way shown.

An upstanding crosspiece 23 fits between arms 19 and 21 and is rigidly secured to the arms and also rigidly secured to support 17. Crosspiece 23 extends just back of the inner upright 18 (see Fig. 6) and is welded to said inner upright. The rear wall of outer upright 18 is cut away at the lower end thereof at 41 (see Fig. 3) to accommodate crosspiece 23. The upright support could be variously otherwise formed than in the particular manner above described, as will readily occur to those skilled in the art.

The upright support 17 may be tilted about axle 25 by the operation of a pair of hydraulic rams 27, the cylinders of which are pivotally mounted at 29 on the body of the truck, and the piston rods of which are pivotally connected at 31 to the upper ends of said arms. It is apparent that the support may be tilted by means other than that specifically shown.

Inner and outer uprights 18 and 19 are noncircular in cross section and preferably are of rectangular cross-sectional configuration, as shown. Thus, the uprights are prevented because of their operatively related, opposed flat surface portions, from rotation relative to one another about their longitudinal axes. In effect, such flat sides provide a non-rotatable connection between the uprights. Other ways of non-rotatably connecting the uprights to one another will readily occur to those skilled in the art.

Figure 2:
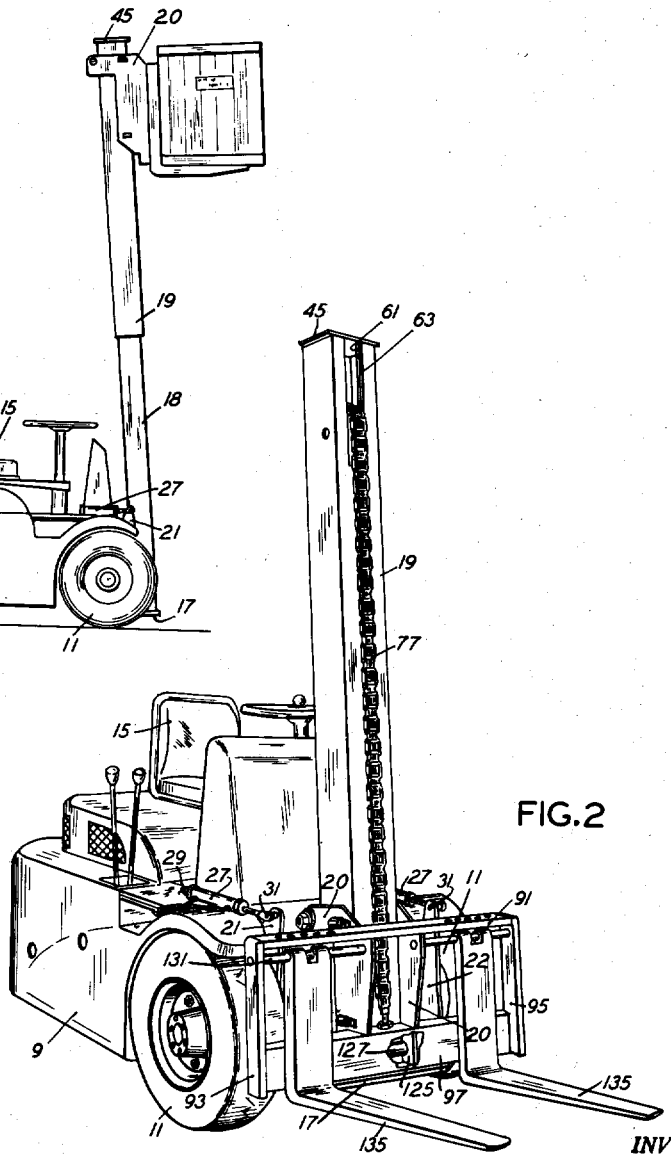
Fig. 2 is a front, right perspective view of the truck in Fig. 1, showing the load elevating mechanism in its lowered position.

As is best shown in Figs. 2, 4 and 5, the tubular uprights have small lateral dimensions relative to the lateral dimension of the truck to provide for remarkably increased visibility for the driver of the truck over that afforded by conventional trucks.

The uprights are shown as being substantially coextensive in length, the lower ends of the outer upright, in the collapsed position of the upright or mast structure, terminating just short of base 17, and the upper end of the outer upright terminating just beyond the upper end of the inner upright and being closed by an end plate 45. The upper end of the inner upright is open, as disclosed in Fig. 6.

Arranged within the inner upright 18 is a hydraulic elevating ram including a cylinder 51 and a plunger 53. Cylinder 51 is mounted at its lower end, such as by a socket connection at 54, on base 17 at a location somewhat forwardly of the central axis of the inner upright, for a reason to presently appear. Hydraulic fluid is adapted to be supplied to and relieved from cylinder 51 by means of a conduit at 56, which extends through crosspiece 23 and the rear wall of inner upright 18 (see Fig. 6).

Figure 7:
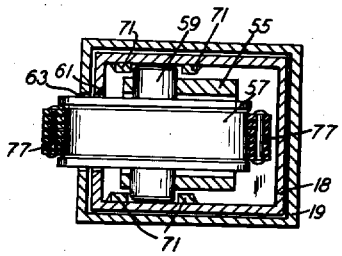
Fig. 7 is an enlarged horizontal section taken along line 7—7 of Fig. 6, more fully showing the manner of guiding and mounting the chain sheave.
Figure 8:
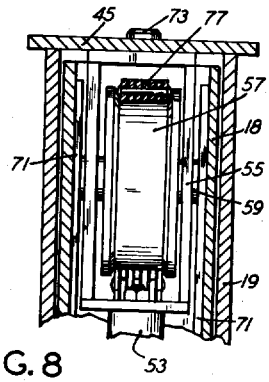
Fig. 8 is an enlarged fragmentary section taken along line 8—8 of Fig. 6.

Fixed to the upper end of plunger 53 is an open, rectangular, generally vertically elongated frame 55 (see Fig. 8). Projecting through the opening in frame 55 is a sheave 57, the sheave having a shaft 59 rotatably extending through the sides of the frame 55 (see Fig. 7). The shaft is shown as being located somewhat forwardly of the center line of plunger 53 for a reason to presently appear.

Shaft 59 of sheave 57 projects beyond the side walls of frame 55 (see Fig. 7) and each end of the shaft is guided for vertical movement by a pair of vertically extending guides 71. These guides are secured in spaced relation to the inner faces of the side walls of the inner upright.

Frame 55 has a guide pin 73 fixed to the top portion thereof. When the plunger 53 is elevated, the pin is moved into a mating hole 75 (see Fig. 9) formed in top plate 45 in vertical alignment with pin 73. Guides 71, above mentioned, function to guide pin 73 into hole 75.

Figure 6:
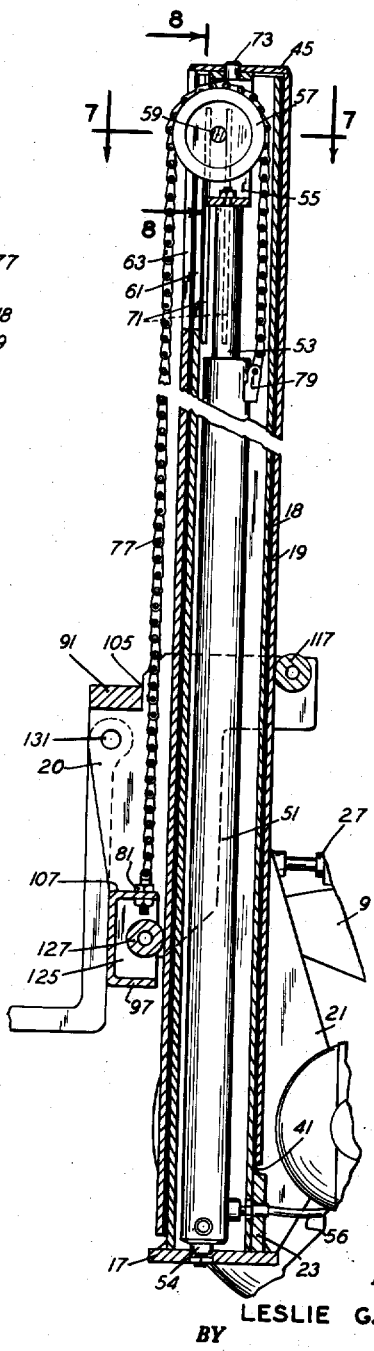
Fig. 6 is a sectional view taken along line 6—6 of Fig. 4.

Sheave 57 has a diameter such that its forward peripheral edge or portion projects through a pair of vertical slots 61 and 63 formed respectively in the front walls of inner upright 18 and outer upright 19 (see Fig. 6). Because of the offest location of the hydraulic elevating ram relative to the inner upright and the offset location of shaft 59 relative to plunger 53, the rear peripheral portion of the sheave is disposed in spaced relation to the inner face of the rear wall of the inner upright. It is, therefore, apparent that the forward reach or length of an elevating chain 77, which is trained over sheave 57, is disposed just forwardly of the front face of the front wall of the outer upright 19, whereas the rear length or reach of said chain is located within the inner upright and is anchored at 79 to the upper end of cylinder 51. Elevating chain 77 is anchored at 81 to load carriage 20.

The particular load carriage shown is merely illustrative of the type that could be employed, and the following details are given merely by way of furnishing a full explanation of the particular embodiment of the invention shown.

The load carriage shown includes a rigid, open rectangular frame which comprises a top horizontal bar 91, side bars 93 and 95, and a bottom member 97. Bottom member 97 is shown as comprising a rearwardly facing channel (see Fig. 6) which has the rear margins of its flanges tapering or converging inwardly, as the parts are depicted in Fig. 4, to merge into straight central edge portions. As shown in Fig. 6, the connection at 81 between the lower end of chain 77 and channel member 97 is at the top upper flange of said channel member.

The load carriage also includes a pair of spaced-apart, parallel, roller supporting plates indicated by the reference numeral 20. Plates 20 are notched at their forward edges at 105 (see Fig. 6) to fit against the rear and bottom faces of top bar 91, to which faces they are secured by welds. The forward edges of the roller supporting plates are also notched at 107 to fit against the upper face of channel member 97 and to depend along the back of said channel member. The roller supporting plates are connected by welds at notches 107 to channel member 97. A gusset plate 111 (see Fig. 4) connects each roller supporting plate to bar 91.

Referring to Figs. 3, 4 and 6, mounted between rearwardly projecting portions of the roller supporting plates is a back roller 117, which rides against the rear face of the outer upright. Rotatably mounted on each roller supporting plate forwardly of roller 117 is a pair of side rollers 119, which project through slots 121 formed in the side roller plates to be disposed in rolling engagement with the side walls of the outer upright. The side rollers 119 of each pair are disposed one above the other in spaced relation as shown in Fig. 3.

Rotatably mounted by a pair of spaced-apart insert plates 125 (compare Figs. 1 and 6) is a front roller 127 which rollingly engages the front face of outer upright 19. Roller 127 is at a lower lever than back roller 117. The spacing of insert plates 125 and their location is the same as that of roller supporting plates 20, and the insert plates are welded at their rear edges to the forward edges of said roller supporting plates, as best shown in Fig. 6.

The provision of rollers at the four flat sides of the outer upright provides a nonrotatable connection between the carriage and the outer upright.

Supported by each roller supporting plate and the adjacent side bar of the carriage is a fork supporting rod 131 (see Fig. 1) which slidably extends through the upper end of a fork 135 of conventional construction. The back sides of the vertical portions of the forks rest at the lower portions thereof against the front face of channel member 97. The forks may be held in any position of lateral adjustment along the rods by any conventional retaining devices (not shown) and which are of no particular concern to the present invention.

Figure 10:
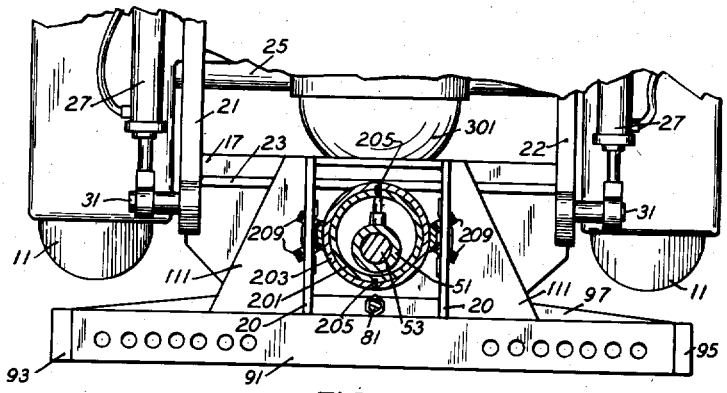
Fig. 10 is a view generally similar to Fig. 4, but showing a modified form of the invention.

A modified form of the invention is disclosed in Fig. 10, in which the elevating mechanism disclosed includes a hydraulic ram at 51, 53 arranged within an inner tubular upright 201. Telescoped over inner tubular upright 201 is an outer tubular upright 203. Tubular uprights 201 and 203 are shown as being circular in cross section but are prevented from rotation relative to one another about their longitudinal axes by keys 205, which are fixed within mating grooves formed in the outer surface of inner upright 201 and are slidably received within mating grooves formed in the inner surface of the outer tubular upright 203. Thus, keys 205 and their keyways may be considered as rendering the tubular uprights 201 and 203 noncircular in cross section.

Fixed to the opposite sides of outer tubular upright 203 is a pair of guide strips 207 which extend substantially from the top to the bottom of the outer upright. A load carriage, indicated by the reference numerals 20, 91 and 111, is movable along the outer upright 203 and carries two pairs of rollers 209 for each strip 207. The pairs of rollers for each strip are arranged one above the other, with the rollers of each pair being disposed one on either side of the strip. Rollers 209 cooperating with strips 207 provide a nonrotatable connection between the load carriage and the outer upright.

The uprights 201 and 203 are tiltably mounted on a lift truck, only the front portion of which is shown, in the same manner as is the upright structure of the first form of the invention.

Figure 11:
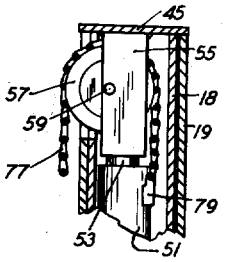
Fig. 11 is a view similar to Fig. 9, but showing another modified form of the invention.

Fig. 11 shows another modified form of the invention in which the sheave frame 55 is fixedly connected to the top piece 45 of the outer upright 19. The construction of the upper end of the elevating mechanism, apart from the difference above explained, is very similar to that of the first form of the invention. However, no guide pin 73 is employed and no guides 71 for shaft 59 are required. In this form of the invention the dimensions of the parts are such that, when the hydraulic elevating ram is in its fully collapsed position, the uprights will be in their fully telescoped positions and the load carriage will be at its lowermost position on the outer upright 19. The invention is not intended to be limited to a construction where the sheave is bodily fixed to the upper end of plunger 53, when the truck is of the general type disclosed in Fig. 11, because the sheave could instead be mounted on the outer upright.

The operation of the form of the lift truck in Fig. 11 is as follows. Since frame 55 is fixed to outer upright 19, any movement of plunger 53 causes a corresponding movement of the outer upright. Because of the chain and sheave arrangement provided, the load carriage will move twice as fast as the outer upright. Thus, any movement of the plunger will cause movement of both the outer upright and the load carriage.

Figure 9:
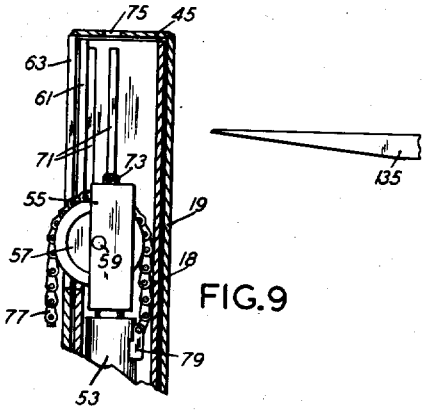
Fig. 9 is a view similar to the upper portion of the view in Fig. 6, but showing the elevating ram in its fully collapsed or telescoped position.

In the first form of the invention, however, the plunger 53 may move upwardly from the position shown in Fig. 9 to the position shown in Fig. 6 without causing any movement of the outer upright 19. Therefore, the load carriage will be moved upwardly from the position shown in Fig. 1 to the position shown in Fig. 6, which is a distance twice that which the plunger 53 moves. This movement of the load carriage without extension of the upright structure is known as free lift. Therefore, the truck of the first form of the invention has free lift, whereas the truck of the third form of the invention is without free lift.

In the first form of the invention, during upward movement of plunger 53 from the Fig. 9 position to the Fig. 6 position, pin 73 is guided into hole 75 by the cooperative engagement between guides 71 and shaft 59 of sheave 57. Upon further upward movement from the Fig. 6 position, the ends of shaft 59 are moved out of guides 71. However, when the ram 53 descends, the ends of shaft 59 will once again enter the guides 71 because pin 73 and the fit of sheave 57 in slots 61 and 63 maintain the alignment between the ends of said shaft and said guides.

If the outer upright, in the elevated condition, should tend to stick, it will be pulled downwardly by sheave 57 when the sheave moves downwardly sufficiently to engage the portions of the inner and outer uprights defining the bottom edges of slots 61 and 63.

Figure 12:
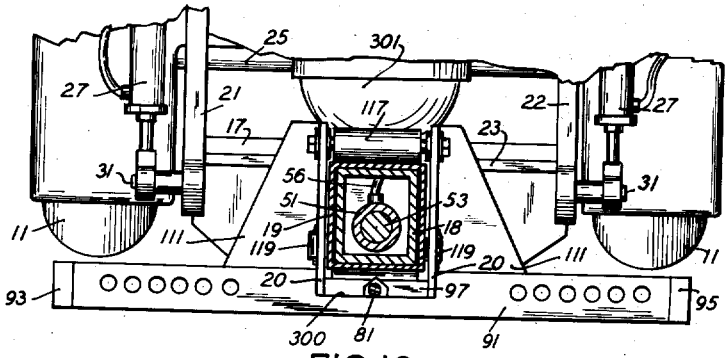
Fig. 12 is a view generally similar to Fig. 4, but showing still another modified form of the invention.

Fig. 12 shows a modified form of the invention where the transverse members of the load carriage are recessed at 300 to accommodate the upright structure. By this arrangement, a load on the carriage forks is disposed closer to the front axle of the particular truck shown than without such recessing. This is important because it decreases the forward tilting moment on the truck for a particular load. The uprights cannot be shifted farther rearwardly because of the presence of the differential housing 301 on the front axle. In some trucks the differential housings will be small enough to permit the uprights to be mounted sufficiently close to the front axle as to dispose the load carriage a minimum distance from the front axle without recessing the load carriage. This minimum distance is that where the load carriage just clears the front tires. However, in other trucks, the differential housings are sufficiently large to prevent such minimum spacing unless the transverse load carriage members are recessed.

Recessing of such transverse load carriage members is permissible with a truck embodying the concepts of the present invention because the rear ends of the load carriage plates 20 are joined by the shaft of roller 117. Thus, when the carriage forks are loaded, the recessed portions of the carriage will be placed in compression, and the roller shaft in tension. This is in contrast to the conventional carriage where the transverse load carriage members are subjected to severe bending stresses when the carriage is loaded, thus preventing recessing such members.

The most important advantage of the lift truck of the present invention is that the visibility of the driver has been remarkably increased as compared to the visibility afforded by conventional lift trucks having uprights formed of spaced-apart vertical members. Referring to Fig. 1, it is evident that the driver can readily see around or past the compact mast structure and observe the position of the forks 135 relative to any load which is to be picked up or deposited. Thus, the driver may pick up and deposit loads considerably faster than heretofore possible. The excellent visibility of the truck of the present invention also enables the operator to readily maneuver the truck down narrow or crowded aisles and thus increase the safe speed of travel of the truck over that at which he would be required to operate a conventional truck.

It is also pointed out that merely mounting the load carriage to ride along and be guided by the outer upright of the upright structure, instead of on the inner upright, permits the width or lateral dimension of the upright structure to be considerably decreased over that of the conventional truck without increasing the side wobble of the carriage relative to the upright on which it rides.

An important feature of the load elevating mechanism of the present invention is that the hydraulic ram is not subjected to bending forces in any of the forms of the invention. That is, in the first form of the invention the load on chain 77, which tends to apply a bending force to plunger 53 to bend the plunger forwardly, as the parts are depicted in Fig. 6, is taken by the cooperative engagement of the ends of the sheave shaft 59 with guides 71, during elevation of the sheave from the Fig. 9 position to the Fig. 6 position. In positions of higher elevation, the guide pin 73 takes such force and prevents bending of the plunger 53. In practice, it has been found that the application of any substantial bending force to the hydraulic ram results in improper operation because such force causes the cylinder to be deformed out of round, which causes objectionable leakage of the hydraulic fluid past the packing between the plunger and cylinder at the upper end of the cylinder.

Another advantage of the lift truck of the present invention is that the hydraulic ram is substantially enclosed within the upright structure so that dirt and foreign matter will not readily be deposited on the plunger 53. Also, by enclosing the hydraulic ram, the ram is prevented from being bumped or struck during operation of the truck as sometimes occurs in operating the conventional lift truck where the hydraulic ram is not protected but is exposed between the spaced, channel-shaped uprights. Although considerable advantage does not result from mounting the ram within the uprights, it is possible to mount the ram outside of the uprights and still retain some of the visibility advantages of the truck of the present invention.

A further advantage of the lift truck of the present invention is that hydraulic fluid which may from time to time leak out of the cylinder 51, between the packing arranged between the cylinder and plunger, will collect within the lower end of the inner upright 35 instead of dropping on the floor or other surface on which the truck is being operated. Such fluid may be periodically removed from the inner upright.

A further feature increasing the visibility of the driver of the lift truck of the present invention is that the load chain 77 is arranged within the lateral confines of the upright structure. This is in contrast to the conventional lift truck where the chains are arranged at the sides of the hydraulic elevating ram and within the space between the ram and the inner upright channels.

In the preferred forms of the invention, the tubular uprights have solid walls, but the invention is not intended to be limited to solid wall tubular members or columns. Thus, the words "tubular" and "columnar" are meant to convey the idea of a member of tubular form or columnar form or configuration, rather than to convey the idea of only a solid wall structure.

Another advantage of the upright structure of the present invention is that it operates successfully under side loading stresses. In cotton topping, the truck is driven along a narrow aisle to the location of the bale to be removed. The aisle is usually too narrow to permit the truck to be turned to face the row of bales, so that the bale must be lifted by means of a boom on the uprights, with the truck facing along the aisle. Thus, the upright structure is subject to severe side loading stresses. Since the conventional spaced uprights cannot be braced by diagonal bracing, because the load carriage rides between the inner uprights, these uprights would be excessively deformed by such a side loading operation. However, the front and rear walls of the uprights of the present invention effectively brace the uprights against undue deformation. Thus, the uprights of the present invention may be successfully used in side loading operations. Also, because the front and rear walls of the uprights of the present invention rigidly join the side walls to one another, the uprights are able to successfully resist torsional stresses that would unduly deform conventional uprights.

The concepts of the present invention have been shown as incorporated in a lift truck having two telescopically related uprights, but it is evident that the invention is not intended to be limited to a truck having two uprights since the concepts of the invention may be incorporated in a lift truck having more or less uprights.

Having described the invention in what are considered to be the preferred embodiments thereof, it is desired that it be understood that the invention is not to be limited by the specific details shown unless they constitute critical features of the present invention, all of which will be apparent by reference to the following claims.

I claim:

1. A lift truck having a single tubular mast at the front end thereof, said mast including inner and outer telescoped tubular uprights, each upright having four sides and being rectangular in cross section, a mount fixedly connected to the lower end of said inner upright and pivotally connected to said truck, means for tilting said uprights relative to said truck, a load carriage, means mounting said carriage on said outer upright for movement therealong but preventing said carriage from turning about said outer upright, said mounting means including guide elements engaging the four sides of said outer upright, power means separate from said uprights and operable independently of tilting movement thereof for elevating said load carriage along said outer upright and for elevating said outer upright relative to said inner upright, said power means including a vertical ram disposed within said inner upright and having a part in fixed relation to said mount and a part movable upwardly when said ram is supplied with fluid under pressure, said inner upright being open at its upper end through which said movable ram part is projected, flexible lift means connected at one end to said carriage and secured at its opposite end in fixed relation to said mount, reeving means at the upper end of said outer upright over which said flexible lift means is trained, means providing a thrust connection between said reeving means and said movable ram part, and means providing a thrust connection between said outer upright and said movable ram part upon upward movement of the latter.

2. A lift truck as defined in claim 1 in which said reeving means is mounted for rotation on the upper end of said outer upright, and in which the means which provides a thrust transmitting connection between said outer upright and said movable ram part fixedly connects the upper end of said movable ram part to the upper end of said outer upright.

3. A lift truck as defined in claim 1 in which there are support members fixedly connected to the upper end of said outer upright and rotatably support said reeving means, and in which the means which provides a thrust transmitting connection between said outer upright and said movable ram part constitutes a connection between said movable ram part and the upper end of said outer upright.

4. A lift truck having a single tubular mast at the front end thereof, said mast including inner and outer telescoped tubular uprights, each upright having four sides and being rectangular in cross section, a mount fixedly connected to the lower end of said inner upright and pivotally connected to said truck, means for tilting said uprights relative to said truck, a load carriage, means mounting said carriage on said outer upright for movement therealong but preventing said carriage from turning about said outer upright, said mounting means including guide elements engaging the four sides of said outer upright, power means separate from said uprights and operable independently of tilting movement thereof for elevating said load carriage along said outer upright and for elevating said outer upright relative to said inner upright, said power means including a vertical ram disposed within said inner upright and having a part in fixed relation to said mount and a part movable upwardly when said ram is supplied with fluid under pressure, said inner upright being open at its upper end through which said movable ram part is projected, flexible lift means connected at one end to said carriage and secured at its opposite end in fixed relation to said mount, reeving means at the upper end of said outer upright over which said flexible lift means is trained, the upper end of said ram being connected to the upper end of said outer upright to provide a thrust transmitting connection between said movable ram part and said outer upright, means mounting said reeving means on the upper end of said outer upright so that said movable ram part simultaneously raises both said outer upright and said reeving means.

5. An attachment for a lift truck comprising a tubular mast to be disposed at the front end of the truck, said mast including inner and outer telescoped tubular uprights, each upright having four sides and being rectangular in cross section, a mount fixedly connected to the lower end of said inner upright and having means for pivotal connection to the truck, means for tilting said uprights relative to said truck, a load carriage, means mounting said carriage on said outer upright for movement therealong but preventing said carriage from turning about said outer upright, said mounting means including guide elements engaging the four sides of said outer uprights, power means separate from said uprights and operable independently of tilting movement thereof for elevating said load carriage along said outer upright and for elevating said outer upright relative to said inner upright, said power means including a vertical ram disposed within said inner upright and having a part in fixed relation to said mount and a part movable upwardly when said ram is supplied with fluid under pressure, said inner upright being open at its upper end through which said movable ram part is projected, flexible lift means connected at one end to said carriage and secured at its opposite end in fixed relation to said mount, reeving means at the upper end of said outer upright over which said flexible lift means is trained, means providing a thrust connection between said reeving means and said movable ram part, and means providing a thrust connection between said outer upright and said movable ram part upon upward movement of the latter.

6. A lift truck having a single tubular mast at the front end thereof, said mast including inner and outer telescoped tubular uprights, each upright having four sides and being rectangular in cross section, means providing a pivotal connection between the lower end of said inner upright and said truck, means for tilting said uprights relative to said truck, a load carriage, means mounting said carriage on said outer upright for movement therealong but preventing said carriage from turning about said outer upright, said mounting means including guide elements engaging the four sides of said outer upright, power means separate from said uprights and operable independently of tilting movement thereof for elevating said load carriage along said outer upright and for elevating said outer upright relative to said inner upright, said power means including a vertical ram disposed within said inner upright and having a part in fixed relation to said mount and a part movable upwardly when said ram is supplied with fluid under pressure, said inner upright being open at its upper end through which said movable ram part is projected, flexible lift means connected at one end to said carriage and secured at its opposite end in fixed relation to said inner upright, reeving means at the upper end of said outer upright over which said flexible lift means is trained, means providing a thrust connection between said reeving means and said movable ram part, and means providing a thrust connection between said outer upright and said movable ram part upon upward movement of the latter.

7. A lift truck as set forth in claim 6 in which said reeving means is mounted for rotation on the upper end of said outer upright, and in which the means which provides a thrust transmitting connection between said outer upright and said movable ram part fixedly connects the upper end of said movable ram part to the upper end of said outer upright.

8. A lift truck as set forth in claim 6 in which the upper end of said ram is connected to the upper end of said outer upright to provide a thrust transmitting connection between said movable ram part and said outer upright, and in which there are means mounting said reeving means on the upper end of said outer upright so that said movable ram part simultaneously raises both said outer upright and said reeving means.

9. A lift truck having a mast structure at the front end thereof, said mast structure having a single tubular mast, said mast including inner and outer tubular uprights in telescopic relation with respect to one another, each upright having four sides and being quadrangular in cross section, said mast structure including a mount fixedly connected to the lower end of said inner upright and pivotally connected to said truck, means for tilting said uprights relative to said truck, a load carriage, means mounting said carriage on said outer upright for movement therealong but preventing said carriage from turning about said outer upright, said mounting means including guide elements engaging the four sides of said outer upright, power means separate from said uprights and operable independently of tilting movement thereof for elevating said load carriage along said outer upright and for elevating said outer upright relative to said inner upright, said power means including a vertical ram disposed within said inner upright, said ram having relatively movable, vertically extensible parts including a part in fixed relation to said mount, said ram having a retracted position in which it is contained with said inner upright, means to conduct fluid under pressure to said ram to cause extension of said ram and cause a part thereof to be projected upwardly, said inner upright being formed with an opening at its upper end through which the last mentioned part is projected, flexible lift means connected at one end to said carriage, reeving means at the upper end of said outer upright over which said flexible lift means is trained, the upper end of said ram being connected to the upper end of said outer upright to provide for upward movement of said outer upright during extension of said ram, said reeving means being mounted on said outer upright at the upper end thereof to provide for simultaneous upward movement of said reeving means and said outer upright during extension of said ram, and means anchoring the other end of said flexible lift means to said ram at a place to multiply the extensible ram movement that causes carriage movement.

*10. A lift truck having a mast structure at the front end thereof, said mast structure having a single tubular mast, said mast including first and second tubular uprights in telescopic relation with respect to one another, with the second upright surrounding the first upright, each upright having four sides and being quadrangular in cross section, said mast structure including a mount fixedly connected to the lower end of said first upright and pivotally connected to said truck, means for tilting said uprights relative to said truck, a load carrying structure, means mounting said load carrying structure on said second upright for movement therealong but preventing said carrying structure from turning about said second upright, said mounting means including guide elements engaging the four sides of said second upright, power means separate from said uprights and operable independently of tilting movement thereof for elevating said load carrying structure along said second upright and for elevating said second upright relative to said first upright, said power means including a vertical ram disposed within said first upright, said ram having relatively movable, vertically*

*extensible parts including a part in fixed relation to said mount, said ram having a retracted position in which it is contained within said first upright, means to conduct fluid under pressure to said ram to cause extension of said ram and cause a part thereof to be projected upwardly, said first upright being formed with an opening at its upper end through which the last mentioned part is projected, flexible lift means connected at one end to said carrying structure, reeving means at the upper end of said second upright over which said flexible lift means is trained, the upper end of said ram being connected to the upper end of said second upright to provide for upward movement of said second upright during extension of said ram, said reeving means being mounted on said second upright at the upper end thereof to provide for simultaneous upward movement of said reeving means and said second upright during extension of said ram, and means anchoring the other end of said flexible lift means*

*to said ram at a place to multiply the extensible ram movement that causes carrying structure movement.*

References Cited in the file of this patent or the original patent

UNITED STATES PATENTS

| | | |
|---|---|---|
| 1,705,145 | Thrift | Mar. 12, 1929 |
| 1,789,025 | Shepard | Jan. 13, 1931 |
| 1,860,222 | Billings | May 24, 1932 |
| 2,456,320 | Repke | Dec. 14, 1948 |
| 2,465,796 | Freeman | Mar. 29, 1949 |
| 2,503,180 | Wagner | Apr. 4, 1950 |
| 2,569,126 | Daniels | Sept. 25, 1951 |
| 2,642,157 | Milz | June 16, 1953 |
| 2,648,401 | Frischmann | Aug. 11, 1953 |
| 2,705,572 | Rush | Apr. 5, 1955 |
| 2,746,612 | Wirz | May 22, 1956 |